(12) United States Patent
Tanaka et al.

(10) Patent No.: US 9,321,193 B2
(45) Date of Patent: Apr. 26, 2016

(54) RESIN PRODUCT MANUFACTURING SYSTEM, MANUFACTURING METHOD, RESIN MOLDING MACHINE AND MOLD

(75) Inventors: Norio Tanaka, Isesaki (JP); Yoshiyasu Horiuchi, Tokorozawa (JP)

(73) Assignee: NIHON SHORYOKU KIKAI CO., LTD., Isesaki-shi, Gunma (JP)

( * ) Notice: Subject to any disclaimer, the term of this patent is extended or adjusted under 35 U.S.C. 154(b) by 604 days.

(21) Appl. No.: 13/061,349

(22) PCT Filed: Nov. 6, 2009

(86) PCT No.: PCT/JP2009/005917
§ 371 (c)(1),
(2), (4) Date: Feb. 28, 2011

(87) PCT Pub. No.: WO2010/131308
PCT Pub. Date: Nov. 18, 2010

(65) Prior Publication Data
US 2011/0193258 A1    Aug. 11, 2011

(30) Foreign Application Priority Data
May 11, 2009   (JP) ................... 2009-114728

(51) Int. Cl.
*B29C 43/40* (2006.01)
*B29C 37/02* (2006.01)
*B29C 45/00* (2006.01)

(52) U.S. Cl.
CPC .............. *B29C 37/02* (2013.01); *B29C 43/40* (2013.01); *B29C 45/0055* (2013.01); *B29C 2045/0077* (2013.01); *B29C 2793/009* (2013.01)

(58) Field of Classification Search
None
See application file for complete search history.

(56) References Cited

U.S. PATENT DOCUMENTS 2,148,079 A * 2/1939 Martin, Jr. .............. 249/52
3,957,411 A * 5/1976 Schiesser ............. 425/215
(Continued)

FOREIGN PATENT DOCUMENTS

| AT | 357 898 B | 8/1980 |
| DE | 3444030 A1 | 6/1986 |

(Continued)

OTHER PUBLICATIONS

Translation of Kakimoto et al, JP 2005-007609 A, Jan. 2005.*
(Continued)

*Primary Examiner* — Ryan Ochylski
(74) *Attorney, Agent, or Firm* — Westerman, Hattori, Daniels & Adrian, LLP

(57) ABSTRACT

It is aimed to provide a resin product manufacturing system, a manufacturing method, a resin molding machine and a mold capable of easily manufacturing a burr-free finished product in injection molding or the like. In a resin product manufacturing system for forming an intermediate product by a resin molding machine and manufacturing a finished product by deburring the intermediate product by a deburring device, the resin molding machine is provided with a mold including a storing portion for storing an overflow resin (burr) formed at a site corresponding to the entire periphery of an intermediate product in a matching surface, the intermediate product having the overflow resin (burr) integrally formed over the entire periphery thereof is formed by the mold, and the deburring device cuts the overflow resin (burr) integrally formed over the entire periphery of the intermediate product together with the burr to manufacture a finished product.

6 Claims, 17 Drawing Sheets

COMPLETION OF COMPRESSION

(56) References Cited

U.S. PATENT DOCUMENTS

| | | | |
|---|---|---|---|
| 5,008,062 A * | 4/1991 | Anderson et al. | 264/272.15 |
| 5,564,714 A | 10/1996 | Katsuno et al. | |
| 5,577,314 A | 11/1996 | Katsuno et al. | |
| 5,676,901 A * | 10/1997 | Higashi et al. | 264/255 |
| 5,733,493 A | 3/1998 | Katsuno et al. | |
| 2004/0099994 A1 | 5/2004 | Brinkhues | |
| 2007/0107204 A1 | 5/2007 | Brinkhues | |
| 2009/0115098 A1 | 5/2009 | De Vries et al. | |
| 2010/0025869 A1 | 2/2010 | Suzuishi et al. | |

FOREIGN PATENT DOCUMENTS

| | | | |
|---|---|---|---|
| DE | 101 22 959 A1 | | 11/2002 |
| FR | 2532239 A | * | 3/1984 |
| GB | 2260932 A | * | 5/1993 |
| JP | 62-220308 A | | 9/1987 |
| JP | 04-223114 A | | 8/1992 |
| JP | 6-58349 U | | 8/1994 |
| JP | 7-241890 A | | 9/1995 |
| JP | 10-024460 A | | 1/1998 |
| JP | 2002-239824 A | | 8/2002 |
| JP | 2004-148773 A | | 5/2004 |
| JP | 2005-007609 A | | 1/2005 |
| JP | 2008-030251 A | | 2/2008 |
| JP | 2008-238701 A | | 10/2008 |
| JP | 2008-273212 A | | 11/2008 |

OTHER PUBLICATIONS

Translation of Takeda, JP 10-024460 A, Jan. 1998.*
Notification of Transmittal of Translation of the International Preliminary Report on Patentability (Form PCT/IB/338) of International Application No. PCT/JP20091005917 with Forms PCT/IB/373 and PCT/ISA/237.
International Search Report of PCT/JP2009/005917, date of mailing Dec. 8, 2009.
Chinese Office Action dated Apr. 10, 2014, issued in corresponding Chinese Patent Application No. 200980123531.7, w/English translation (19 pages).
Japanese Office Action dated Feb. 2, 2010, issued in corresponding JP Patent Application No. 2009-251670 with English translation (7 pages).
Japanese Office Action dated Jun. 22, 2010, issued in corresponding JP Patent Application No. 2009-251670 with English translation (6 pages).
Extended European Search Report dated Jul. 22, 2015, issued in counterpart application No. 09844582.8 (9 pages).

* cited by examiner

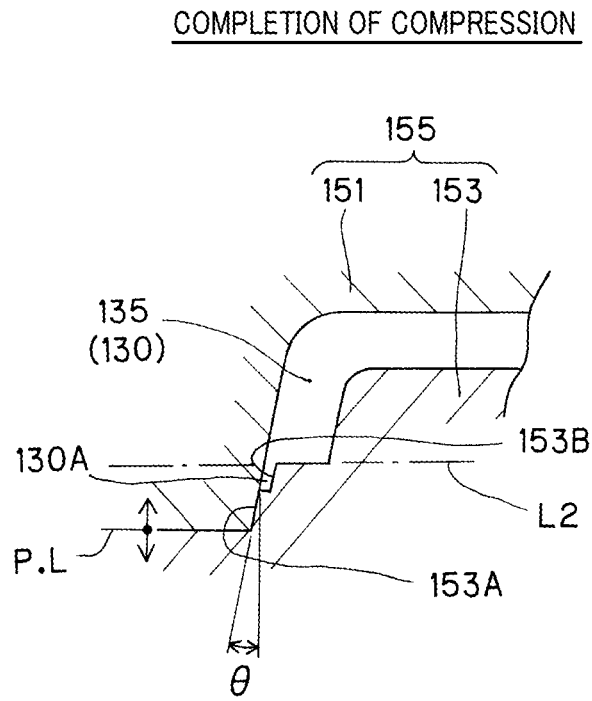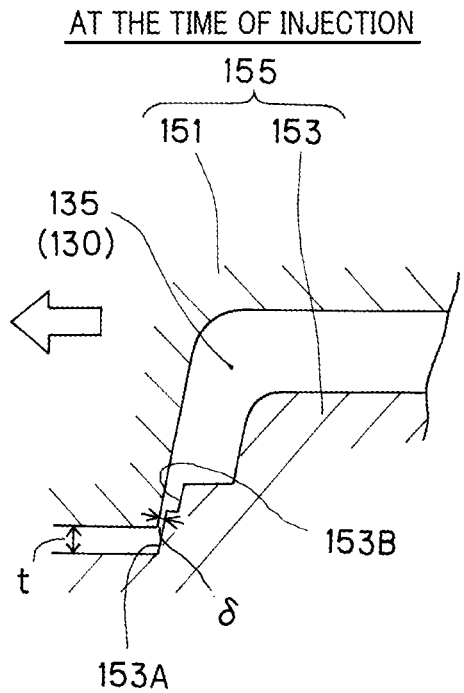
FIG.7A
COMPLETION OF COMPRESSION
FIG.7B
AT THE TIME OF INJECTION

COMPLETION OF COMPRESSION

AT THE TIME OF INJECTION

RESIN PRODUCT MANUFACTURING SYSTEM, MANUFACTURING METHOD, RESIN MOLDING MACHINE AND MOLD

TECHNICAL FIELD

The present invention relates to a resin product manufacturing system, a manufacturing method, a resin molding machine and a mold for manufacturing by injection molding, compression molding or the like.

BACKGROUND ART

Generally, there is known an injection molding technology for forming a resin molding product by injecting molten resin into a mold at a high pressure. Since the molten resin is injected into the mold at the high pressure in this type of injection molding technology, the mold is, for example, opened by this pressure and a thin burr is readily formed on matching surfaces (parting surfaces) of a fixed mold and a movable mold.

Conventionally, there has been proposed a technology for suppressing the formation of a burr on parting surfaces by providing a movable member on the parting surface of a fixed mold or a movable mold and pressing the movable member against the parting surfaces (see, for example, patent document 1).

On the other hand, there has been conventionally proposed a deburring device including a cutter blade with a cutting edge portion corresponding to a base end of a burr and a profiling portion corresponding to a surface portion of a product and not constituting a cutting edge and adapted to move the cutter blade along the base end of the burr while vibrating the cutter blade, thereby efficiently removing the burr (see, for example, patent document 2). There has been also proposed a technology in which an end mill is inserted through a profiling guide member and a burr is cut off by the end mill while the profiling guide member is pressed against a work and moves along the work (see, for example, patent document 3).

CITATION LIST

Patent Document

[Patent Document 1]
Japanese Patent Publication No. H07-241890
[Patent Document 2]
Japanese Patent Publication No. 2008-30251
[Patent Document 3]
Japanese Patent Publication No. 2002-239824

SUMMARY OF INVENTION

Technical Problem

However, in patent document 1, the movable member is slid while being strongly held in contact with the mold during resin molding. Thus, in the case of molding a resin containing a hard stiffener such as glass fibers or carbon fibers and the like, there has been a problem that sliding surfaces of the mold and the movable member are intensely worn to drastically shorten the repair cycle of the mold. Further, burr formation is not completely eliminated, necessitating a secondary processing for deburring. These are similarly problematic for general resin molding products containing no above hard stiffener.

In patent documents 2, 3, the burr can be efficiently removed when a projecting height of the burr from a product surface is a certain height or higher. If a projecting amount is too little, the burr may not be able to be efficiently removed.

Accordingly, an object of the present invention is to solve the problems inherent in the prior arts described above and provide a resin product manufacturing system, a manufacturing method, a resin molding machine and a mold capable of easily manufacturing a burr-free finished product in injection mold or the like.

Solution to Problem

The present invention is directed to a resin product manufacturing system for forming an intermediate product by a resin molding machine and manufacturing a finished product by deburring the intermediate product by a deburring device, characterized in that the resin molding machine comprises a mold including a storing portion for storing an overflow resin formed at a site corresponding to the entire periphery of an intermediate product in a matching surface and the intermediate product having the overflow resin integrally formed over the entire periphery thereof is formed by the mold, and the deburring device cuts off the overflow resin integrally formed over the entire periphery of the intermediate product together with the burr to manufacture a finished product.

In this specification, a product formed by the resin molding machine and having a burr not yet removed is defined to be an intermediate product and a product after deburring is defined to be a finished product.

In this case, the deburring device may include a cutter blade with a cutting edge portion corresponding to the base end of the overflow resin and a profiling portion corresponding to a surface portion of the intermediate product and not constituting a cutting edge, and the overflow resin integral to the intermediate product may be cut off together with the burr by moving the cutter blade along the base end of the overflow resin while vibrating the cutter blade.

Since the formation of the overflow resin is permitted on a parting surface of the intermediate product in these constructions, efficient deburring is performed by the deburring device removing the overflow resin in a later process. In other words, if a burr is formed, it is formed at a tip of the overflow resin. Thus, a burr-free finished product can be easily manufactured by the deburring device cutting off the overflow resin together with the burr.

In this case, the resin molding machine may be a low pressure compression molding machine, a high-pressure compression molding machine, a foam molding machine, a carbon-fiber injection molding machine or the like besides being a general molding machine such as an injection molding machine. If a foam molding machine is employed, an effect of completely cutting off a burr together with an overflow resin can be obtained by providing an overflow resin at the time of foam injection molding. Further, an effect of completely removing a burr together with an overflow resin, for example, by an ultrasonically vibrated cutter can be obtained by providing the overflow resin in a carbon fiber injection molding machine.

In resin molding by a resin molding machine or the like, the structure of the molding machine, a mold used therein and a resin component vary. Particularly, it is difficult to feed an optimal amount of resin into a cavity of the mold and molding becomes unstable if the resin amount is too much or too little.

Since the mold is formed with the storing portion for the overflow resin in this invention, a variation in the resin amount is automatically adjusted by the amount of the overflow resin in the storing portion when the resin amount is too much or too little, wherefore the resin amount in the cavity becomes stable to enable stable molding.

In this case, the overflow resin may be integrally formed in a formation direction of a vertical burr extending in an opening direction of the mold.

The overflow resin may be integrally formed in a formation direction of a horizontal burr extending in a direction orthogonal to the opening direction of the mold.

Gas may be vented through the storing portion for the overflow resin.

If the overflow resin is integrally formed in the formation direction of the vertical burr or the horizontal burr, it is sufficient for the mold to be formed with the storing portion for storing the overflow resin in the matching surface of the mold, wherefore it becomes easier to fabricate the mold. In addition, if gas is vented through the storing portion for the overflow resin, defects such as burr formation and resin burning caused by degassing concentrate on the overflow resin and a resin product can be manufactured without leaving any defect in the finished product by removing the overflow resin together with the burr.

Since the burr formed in the intermediate product is removed by the deburring device, it is desirable to form the burr within the reach of a tool of the deburring device.

The above burr formed on the intermediate product is set at a predetermined position, e.g. in a range planned to be the entire periphery of a parting line and this burr is removed by the deburring device, wherefore a trace of deburring can be confirmed in the above planned range, for example, with a microscope.

The present invention may be also directed to a resin product manufacturing method for forming an intermediate product by a resin molding machine and manufacturing a finished product by deburring the intermediate product, comprising a step of forming an intermediate product having an overflow resin integrally formed over the entire periphery thereof by a mold including a storing portion for storing the overflow resin formed at a site corresponding to the entire periphery of the intermediate product in a matching surface; and a step of manufacturing a finished product by cutting off the overflow resin integrally formed on the entire periphery of the intermediate product together with the burr.

The present invention may be further directed to a resin molding machine for forming an intermediate product including a burr to be removed by a deburring device, comprising a mold including a storing portion for storing an overflow resin formed at a site corresponding to the entire periphery of an intermediate product in a matching surface, wherein the intermediate product having the overflow resin including the burr integrally formed over the entire periphery thereof is formed by the mold.

The present invention may be furthermore directed to a mold for resin molding machine for forming an intermediate product including a burr to be removed by a deburring device, comprising a storing portion for storing an overflow resin formed at a site corresponding to the entire periphery of an intermediate product in a matching surface, wherein the mold forms the intermediate product having the overflow resin including the burr integrally formed over the entire periphery thereof.

Advantageous Effects of Invention

Since the formation of the overflow resin is permitted on the parting surface of the intermediate product in the present invention, a deburred surface is finely finished to have a specified outer shape and efficient deburring is performed by the deburring device removing the overflow resin. In other words, if a burr is formed, this is formed at the tip of the overflow resin. Therefore, the burr-free finished product can be easily manufactured by the deburring device cutting off the overflow resin together with the burr.

BRIEF DESCRIPTION OF DRAWINGS

FIG. 7A is a partial enlarged view of the mold and FIG. 7B is a sectional view showing an opened state of the mold.

DESCRIPTION OF EMBODIMENTS

Hereinafter, one embodiment of the present invention is described with reference to the drawings.

Figure 1:
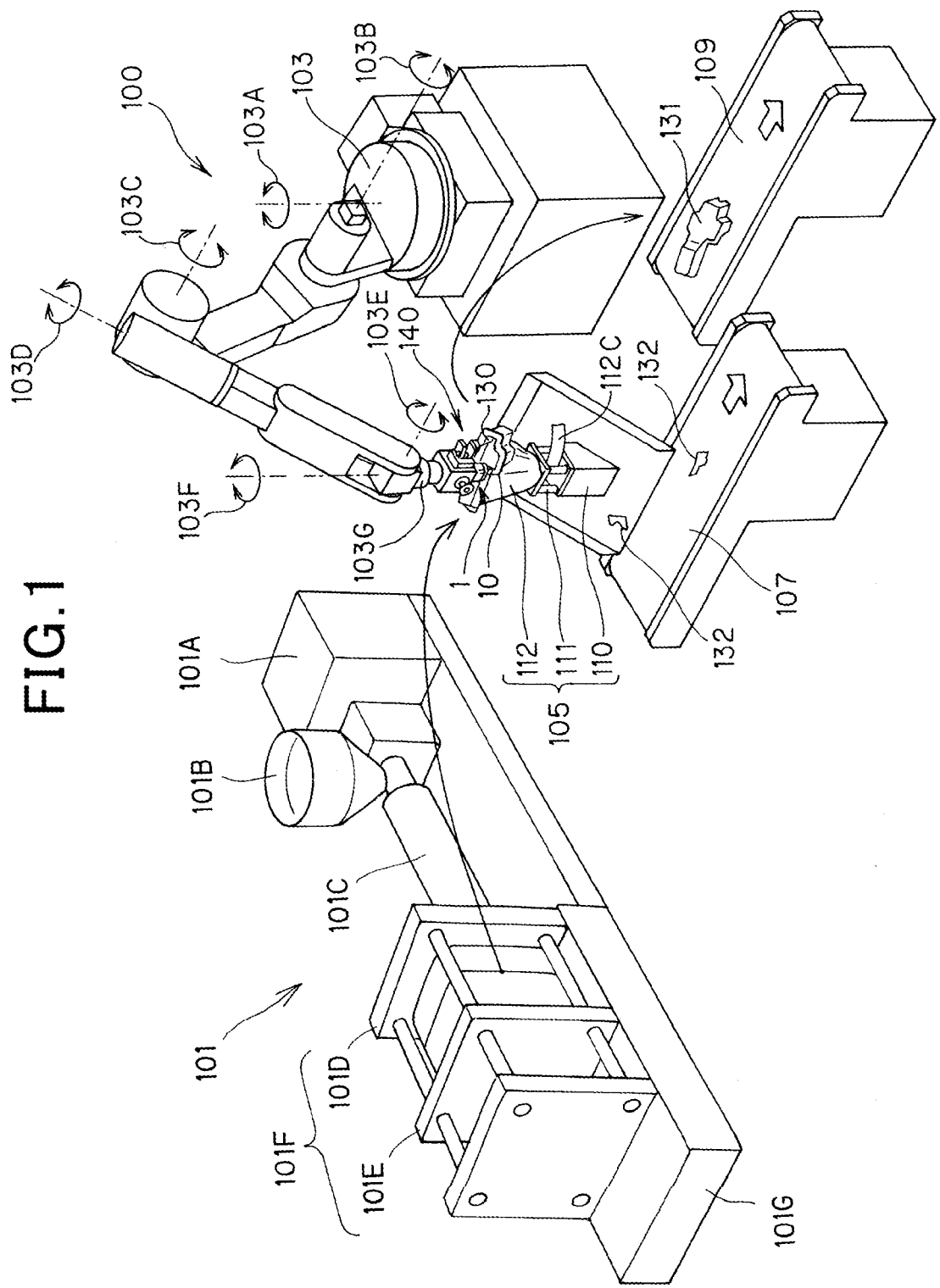
FIG. 1 is a perspective view showing one embodiment of a deburring system.
Figure 4:
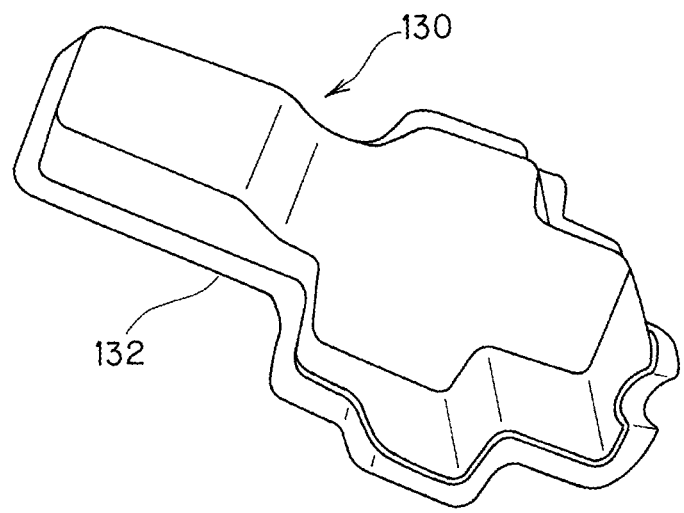
FIG. 4 is a perspective view showing an example of the shape of the work before deburring.
Figure 5:
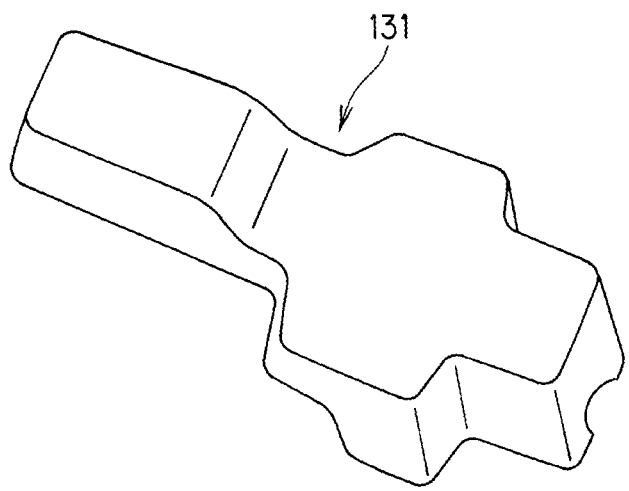
FIG. 5 is a perspective view showing an example of the shape of the work after deburring.

In FIG. 1, denoted by 100 is a resin product manufacturing system. The resin product manufacturing system 100 includes a resin molding machine 101, an articulated robot 103 having a work holding device and a deburring device at a tip portion of an arm, a work receiving mechanism 105 on which a work 130 (see FIG. 4) as an intermediate product before deburring is to be placed, a burr discharge conveyor 107 for discharging a removed burr 132 to the outside of the system, and a finished product discharge conveyor 109 for discharging a work 131 (see FIG. 5) as a finished product after deburring to the outside of the system. Although not shown, a storage rack for storing finished products may be provided in place of the finished product discharge conveyor 109.

The resin molding machine 101 includes, on a base 101G, a driving mechanism 101A, a hopper unit 101B storing a resin material, a screw unit 101C for feeding the resin and a molding unit 101F, wherein the molding unit 101F includes a fixed unit 101D and a movable unit 101E. Molten resin fed from the hopper unit 101B via the screw unit 101C is molded in the molding unit 101F to become a resin product (intermediate product to be described in detail later). In the molding unit 101F, when the movable unit 101E moves backward with respect to the fixed unit 101D, molds (not shown) provided in the respective units 101D, 101E are opened and the molten resin is fed into the mold through a gate. The molten resin is compressed between the molds by a forward movement of the movable unit 101E to form an intermediate product.

The articulated robot 103 includes joints 103A to 103F, and a mechanism unit 140 as an integral unit of the work holding device and the deburring device is mounted on an arm tip portion 103G of a leading joint 103F.

Figure 2:
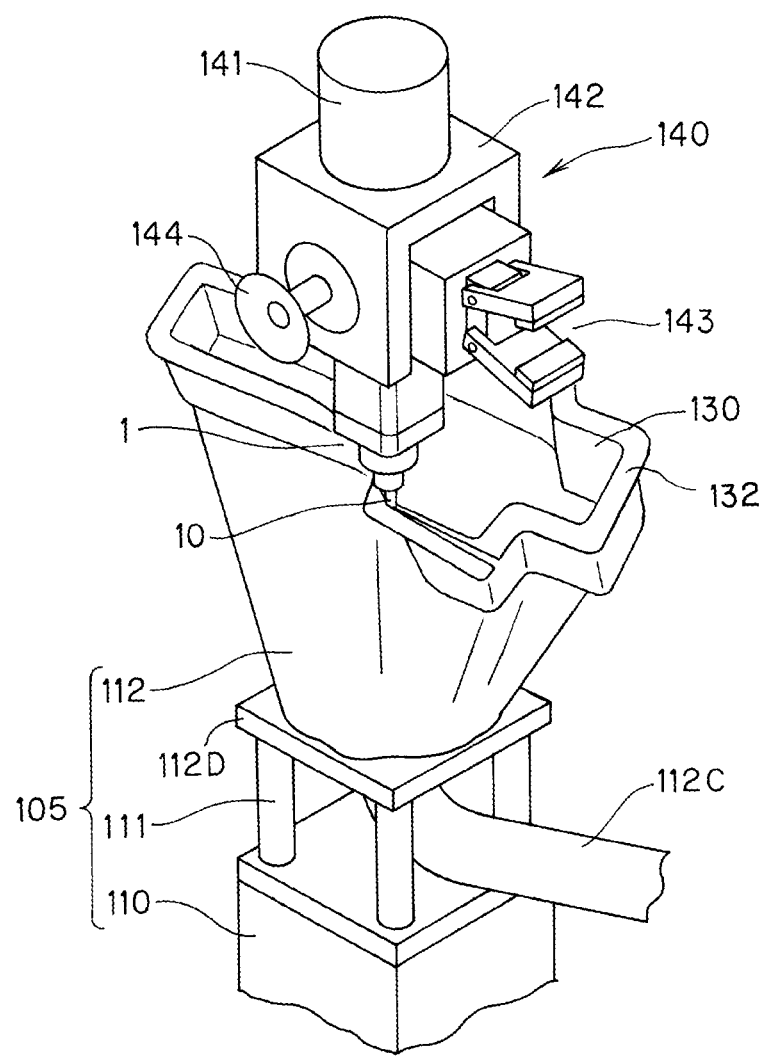
FIG. 2 is a perspective view showing an operation of deburring a work.

As shown in FIG. 2, this mechanism unit 140 includes a cylindrical base portion 141 to be mounted on the arm tip portion 103G, a substantially U-shaped holder 142 connected to this base portion 141, a hand portion 143 for work holding arranged on a first surface of this holder 142 and a suction pad portion 144 for work suction arranged on a second surface of the holder 142, wherein the suction pad portion 144 is connected to a vacuum source via a connection hose (not shown). The hand portion 143 for work holding is operated by an air cylinder (not shown).

The deburring device 1 is mounted on a third surface (lower surface in FIG. 2) of the holder 142, a cutter blade 10 in the form of a flat blade is fixed to the leading end of the deburring device 1, and the burr 132 of the work 130 on the work receiving mechanism 105 is removed by the cutter blade 10.

Figure 3:
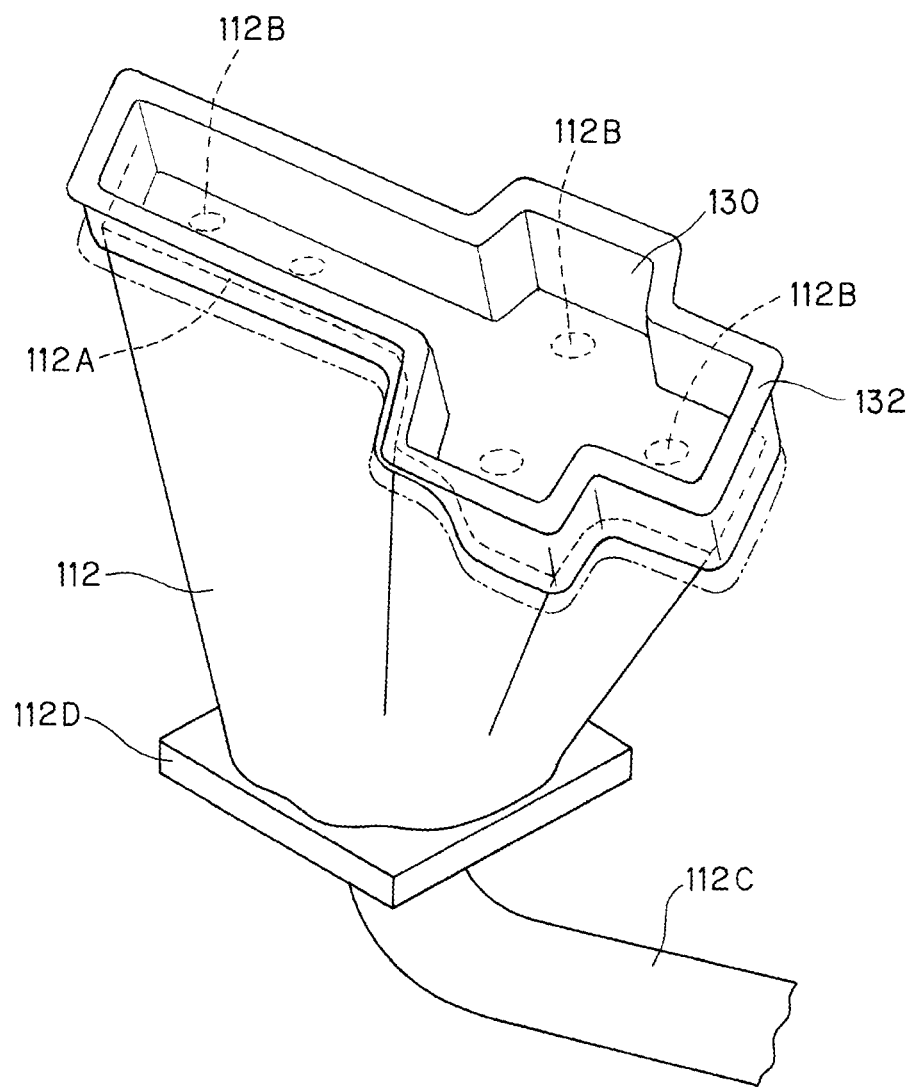
FIG. 3 is a perspective view showing a part of a work receiving jig.

The work receiving mechanism 105 includes a mechanism base 110 and a work receiving jig 112 connected to the mechanism base 110 by a plurality of bolts 111. As shown in FIG. 3, a work placing portion 112A at the top of the work receiving jig 112 is formed with a receiving groove engageable with, for example, a projection on the work 130. The work 130 is placed on the work placing portion 112A by being dropped from a solid-line position to an imaginary-line position to engage the projection thereof with the receiving groove.

The work placing portion 112A is formed with an inlet 112B for suction. The inlet 112B is connected to the vacuum source via a connection hose 112C, whereby the work 130 is fixed by suction when being placed on the work placing portion 112A. The shape of the work placing portion 112A is determined according to the shape of the projection of the work 130, the shape of a burr formed on the work and the like, and is at least so set as to enable the removal of the burr formed on the work 130 by the cutter blade 10, i.e. as not to hinder a deburring operation by the cutter blade 10.

The work placing portion 112A includes a support base 112D. In the case of changing the shape of works to be molded through the replacement of molds of the resin molding machine 101, an assembly of the support base 112D and the parts thereabove is replaced by another work receiving jig 112 including a work placing portion 112A corresponding to the work shape. In this deburring system 100, a setup is changed by replacing the work receiving jig 112, thereby shortening a setup time.

Figure 6:
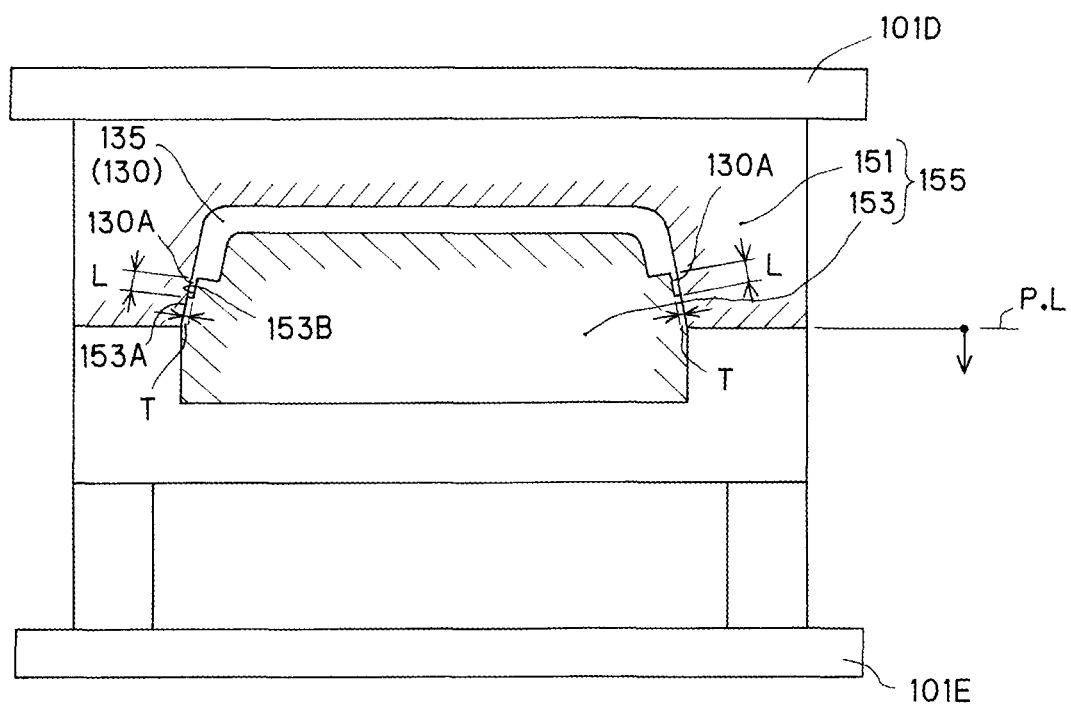
FIG. 6 is a sectional view of a mold.

FIG. 6 is a sectional view of the resin molding machine 101. FIG. 7A is a partial enlarged view (at the completion of compression) of the work 130 of FIG. 6, and FIG. 7B is a sectional view (at the time of injection) showing an opened state of the mold of FIG. 7A. Note that the work in FIGS. 6 and 7 differ from the one shown in FIGS. 1 to 5 in shape, but it is described as the same type below to facilitate the description.

The resin molding machine 101 described above includes a mold 155 composed of a fixed mold 151 provided in the fixed unit 101D (see FIG. 1) and a movable mold 153 provided in the movable unit 101E, and the movable mold 153 is moved toward the fixed mold 151 of the fixed unit 101D to compression-mold the work 130 by driving the movable unit 101E by a driving mechanism (or a servo motor driving mechanism) having a direct press structure by a hydraulic pressure or a toggle structure.

In this embodiment, as shown in FIGS. 7A and 7B, the movable mold 153 includes a storing portion 153B formed in a matching surface 153A of the mold 153 for storing an overflow resin 130A corresponding to a so-called vertical burr and extending like a flat plate in a mold opening direction. This storing portion 153B is recessed and formed at a site corresponding to the entire periphery of the work 130 in the matching surface 153A of the movable mold 153. When a gate for resin injection is located at the matching surface 153A, the storing portion 153B is formed at a site including the gate and corresponding to the entire periphery of the work 130. Preferably, a depth T of the storing portion 153B is 0.05 mm or larger and a length L thereof is 0.05 mm or larger. An upper limit value of the length L is, for example, ½ of the depth T, preferably ⅓ of the depth T. The respective dimensions are appropriately determined according to the property of the resin material, the size of products and the like.

With reference to FIG. 6, at the time of resin molding, a parting line P·L of the movable mold 153 is separated from the fixed mold 151 by a predetermined distance in an opening direction (see FIG. 7B) and a predetermined amount of the molten resin material is injected into a molding product space (cavity) 135. Thereafter, the movable mold 153 is moved toward the fixed mold 151, parting lines P·L meet, and the fixed mold 151 and the movable mold 153 are clamped (see FIG. 7A) to compression-mold the work 130.

If "t" (e.g. t=0.5 mm or larger) denotes an opening amount of the mold as shown in FIG. 7B, a clearance δ resulting from a draft angle θ (see FIG. 7A) is formed between the fixed mold 151 and the movable mold 153. Accordingly, in the process of clamping the fixed mold 151 and the movable mold 153, gas is vented from taper surfaces (matching surfaces) with an inclination θ (e.g. 1° to 3°) of the respective molds. Since this degassing is performed through a resin part of the overflow resin 130A stored in the storing portion 153B at the time of resin molding, if resin burning or the like should occur, it will occur at the resin part of the overflow resin 130A. Since the overflow resin 130A is removed in a deburring process to be described later, there is no likelihood of leaving resin burning or the like on a finished product.

In the above construction, the molten resin material may be injected into the molding product space 135 at a low pressure and, thereafter, the fixed mold 151 and the movable mold 153 may be clamped at a low pressure. In this case, the resin molding machine 101 is not limited to the above construction and may be a usual injection molding apparatus for injecting molten resin into a mold at a high pressure and clamping the mold at a high pressure.

The overflow resin 130A formed in the above storing portion 153B is a part to be cut off in the deburring process to be described later, and the depth T and length L thereof are not limited to the above respective dimensions and set at arbitrary depth T and length L according to the quality of the resin material or the like or suitable for cutting by the deburring device. The resin is wasted if the depth T and the length L are too large, and deburring is difficult if they are too small. In resin molding by the resin molding machine 101, a molding apparatus performance, the mold used, a resin component and the like vary. Particularly, it is difficult to feed an optimal amount of resin into the cavity of the mold and molding becomes unstable if the amount of resin is too much or too little. Since the mold is formed with the storing portion 153B for the overflow resin in this construction, the storing portion 153B is filled with the overflow resin if a large amount of resin is injected into the mold and a smaller amount of overflow resin enters the storing portion 153B if a small amount of resin is injected. A variation in the resin injection amount is automatically adjusted by the amount of the overflow resin, wherefore the resin amount in the cavity becomes stable to enable stable molding.

Further, since the overflow resin is permitted in this construction, it is not necessary to suppress burr formation at the time of molding and a resin molding product of a higher quality can be manufactured when the molten resin material is injected into the molding product space 135 at a low pressure and, thereafter, the fixed mold 151 and the movable mold 153 are clamped at a low pressure, i.e. when low-pressure compression molding is performed as described above.

In addition, if a molding apparatus for clamping the respective molds 151, 153 at a low pressure is used, a required mold clamping force thereof can be suppressed to ¼ to ⅕ of a conventionally required mold clamping force.

In this construction, the overflow resin 130A is equivalent to a conventional so-called burr and synonymous with the burr 132. By permitting this overflow resin 130A, the burr can be substantially perfectly removed in the subsequent process, the resin molding product is finely finished, and a great difference is brought about for the purpose.

Figure 8A:
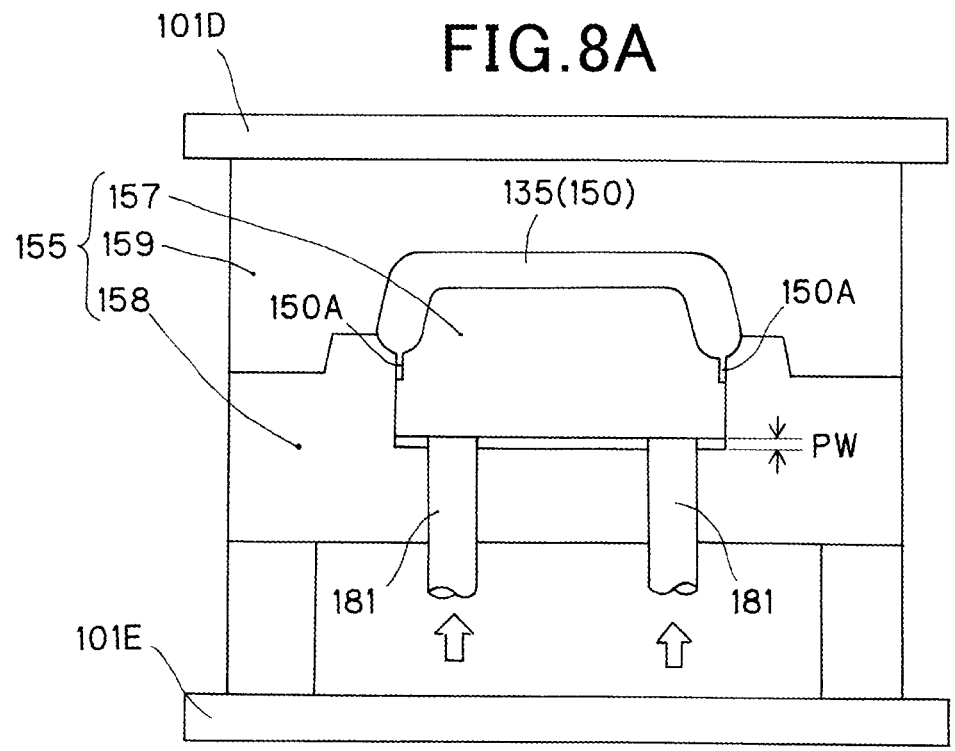
FIG. 8A is a sectional view of a mold.

FIG. 8 show another embodiment of the resin molding machine.

This resin molding machine 101 includes a mold 155 composed of a fixed mold 159 provided in the fixed unit 101D (see FIG. 1) and movable molds 158 and 157 provided in the movable unit 101E. Denoted by 181 is a shaft of a hydraulic cylinder connected to the movable mold 157. The movable mold 157 is opened or moved in a compression direction via the shaft 181. Denoted by PW is a compression margin.

Figure 8B:
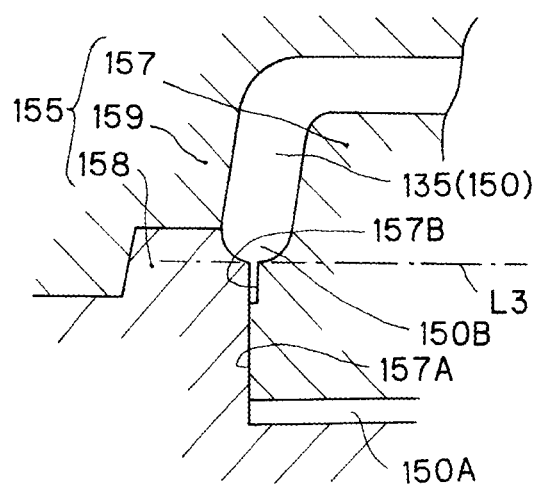
FIG. 8B is a partial enlarged view of the mold and FIG. 8C is a sectional view showing an opened state of the mold.
Figure 8C:
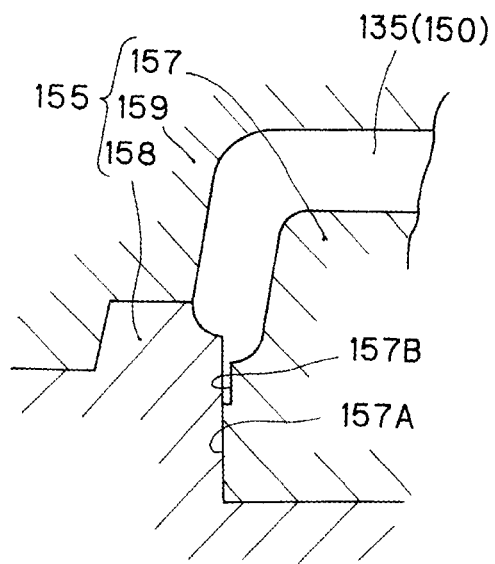

In this embodiment, a work 150 is a product with a bead 150B as shown in FIG. 8B (at the completion of compression) and FIG. 8C (at the time of injection), and a storing portion 157B for storing an overflow resin 150A corresponding to a vertical burr and extending like a flat plate in a mold opening direction is formed in a matching surface 157A of the movable mold 157.

This storing portion 157B is recessed and formed at a site corresponding to the entire periphery of the work 150 in the matching surface 157A of the movable mold 157. Preferably, a depth T and a length L of the storing portion 157B are, for example, 0.05 mm or larger and 0.05 mm or larger as in the above embodiment. An upper limit value of the length L is, for example, ½ of the depth T, preferably ⅓ of the depth T. The respective dimensions are appropriately determined according to the property of a resin material, the size of products and the like.

Figure 9A:
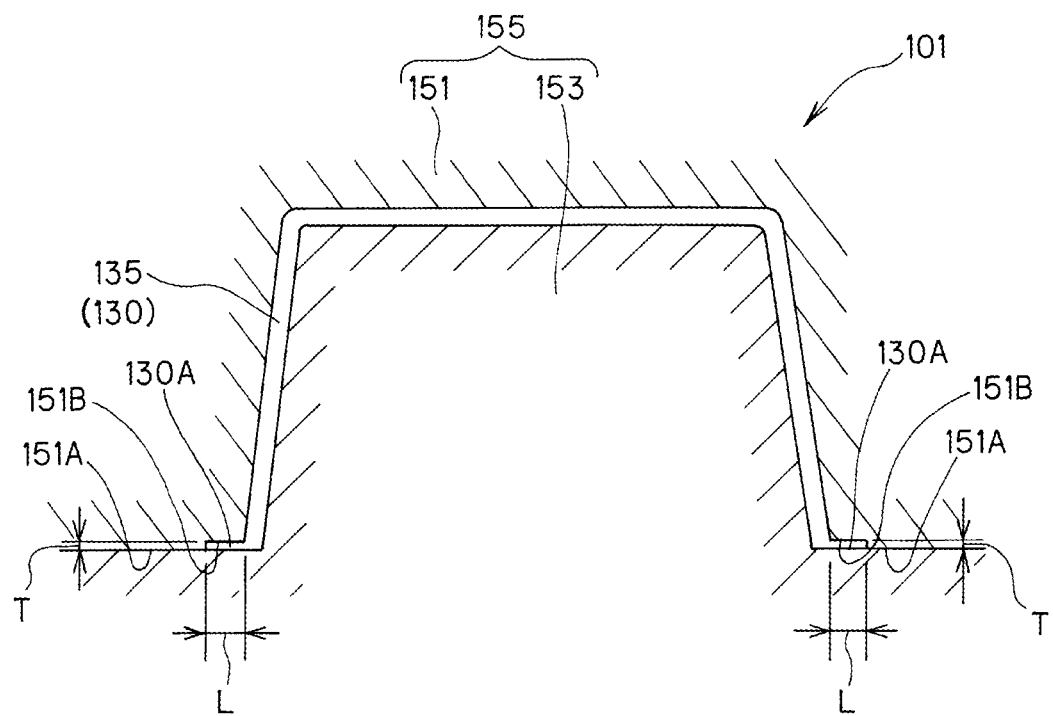
FIG. 9A is a sectional view of a mold and FIG. 9B is a plan view showing a matching surface of the mold.

FIG. 9 show the form of a so-called horizontal burr. In FIG. 9, the same parts as in FIG. 7 are denoted by the same reference numerals and not described.

In this case, a storing portion 151B for storing an overflow resin 130A corresponding to a so-called horizontal burr and extending like a flat plate in a direction perpendicular to the mold opening direction is formed in a matching surface 151A of the fixed mold 151.

This storing portion 151B is recessed and formed at a site corresponding to the entire periphery of the work 130 in the matching surface 151A of the fixed mold 151. A depth T of the storing portion 151B is, for example, 0.05 mm or larger and a length L thereof is, for example, 0.05 mm or larger. An upper limit value of the length L is, for example, ½ of the depth T, preferably ⅓ of the depth T. The respective dimensions are appropriately determined according to the property of the resin material, the size of products and the like. In other words, the overflow resin 130A formed in the storing portion 151B is a part to be cut off in the deburring process to be described later, and the depth T and length L thereof are not limited to the above respective dimensions and set at arbitrary depth T and length L suitable for cutting by the deburring device. The resin is wasted if the depth T and length L are too large, and deburring is difficult if they are too small.

Figure 9B:
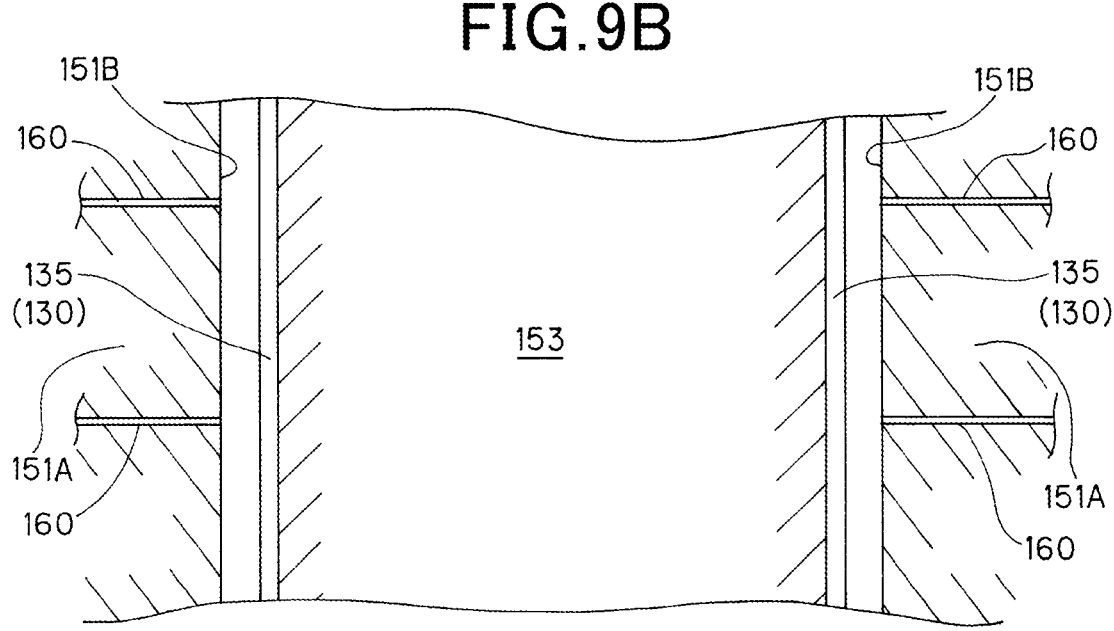

Further, as shown in FIG. 9B, a plurality of gas vent holes 160 are so formed in the matching surface 151A of the fixed mold 151 as to be orthogonal to an extension direction of the storing porting 151B. These gas vent holes 160 are for discharging gas in the cavity 135 and formed at suitable intervals in a circumferential direction in the entire matching surface 151A.

In this embodiment, gas is vented through the overflow resin 130A stored in the storing portion 151B at the time of resin molding.

Figure 10:
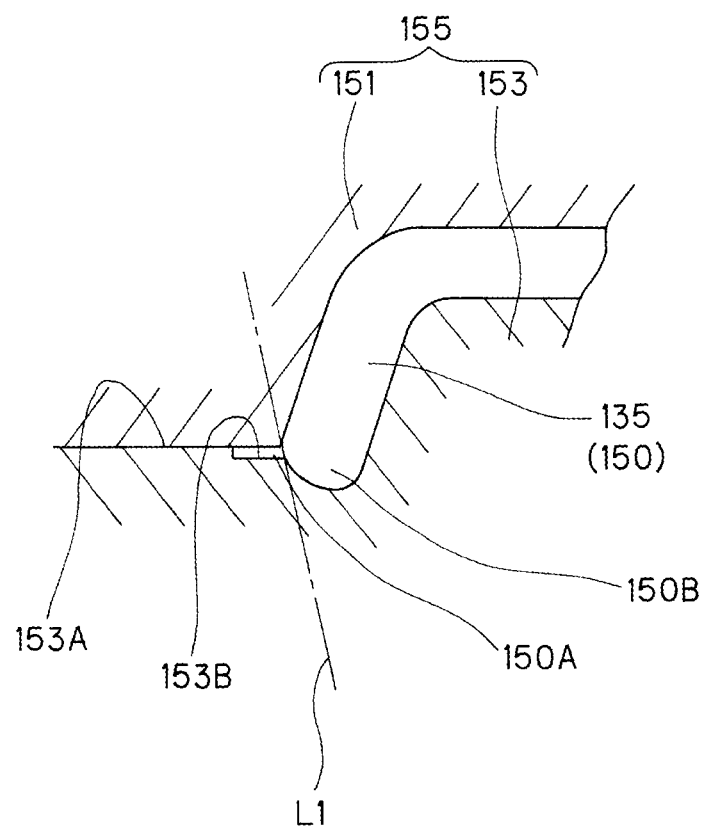
FIG. 10 is a sectional view of a mold according to another embodiment.

Accordingly, if resin burning or the like should occur, it will occur at the overflow resin 130A. Since the overflow resin 130A is removed in the deburring process to be described later, there is no likelihood of leaving resin burning or the like on a finished product. In this case, the work 150 may be a product with a bead 150B as shown in FIG. 10 and a storing portion 153B for storing an overflow resin 150A corresponding to a horizontal burr and extending like a flat plate in the direction orthogonal to the mold opening direction may be formed in the matching surface 153A of the movable mold 153.

In this resin molding machine 101, regardless of which of the above molds 155 is used, the fixed mold and the movable mold(s) are clamped at a low or high pressure after the molten resin material is injected into the molding product space (cavity) 135 at a low or high pressure at the time of resin molding.

If the work 130 or 150 is resin-molded through this step, an intermediate product having the overflow resin 130A or 150A integrally formed on the parting surface of the work 130 or 150 is formed. In this case, a so-call conventional burr is formed on a peripheral portion of the tip of the overflow resin 130A or 150A.

Figure 11:
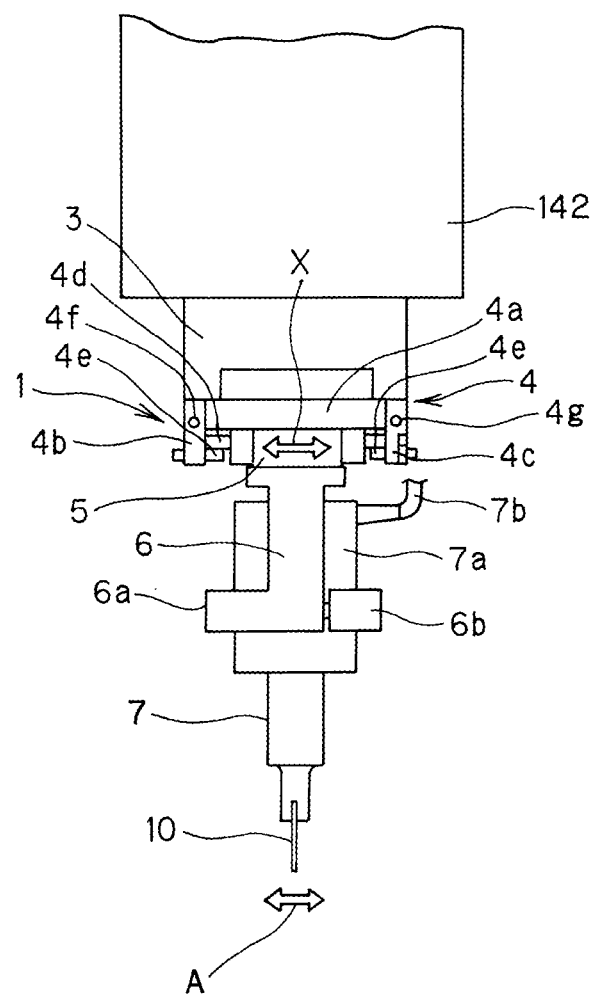
FIG. 11 is a front view showing one embodiment of a deburring device.

FIG. 11 shows a deburring device 1.

The deburring device 1 is mounted on the third surface (lower surface in FIG. 11) of the holder 142. The deburring device 1 includes a supporting body 3 fixed to the third surface, and a slide table device 4 of an air drive type is fixed to the supporting body 3. The slide table device 4 includes a fixing portion 4a fixed to the supporting body 3, supporting portions 4b, 4c fixed to the opposite ends of the fixing portion 4a, a shaft 4d provided between the respective fixing portions 4b and 4c and a sliding portion 5 slidable on the shaft 4d. The sliding portion 5 is reciprocally movable in predetermined straight directions (directions of arrows X), and the lower surface of the cutter blade, which is a so-called flat blade, can be pressed against a work in these straight directions. Denoted by 4e are stoppers. An air supply port 4f is formed in one supporting portion 4b, an air discharge port 4g is formed in the other supporting portion 4c and a pressure regulator (not shown) for regulating the pressure of supplied air is connected to the air supply port 4f.

Figure 12:
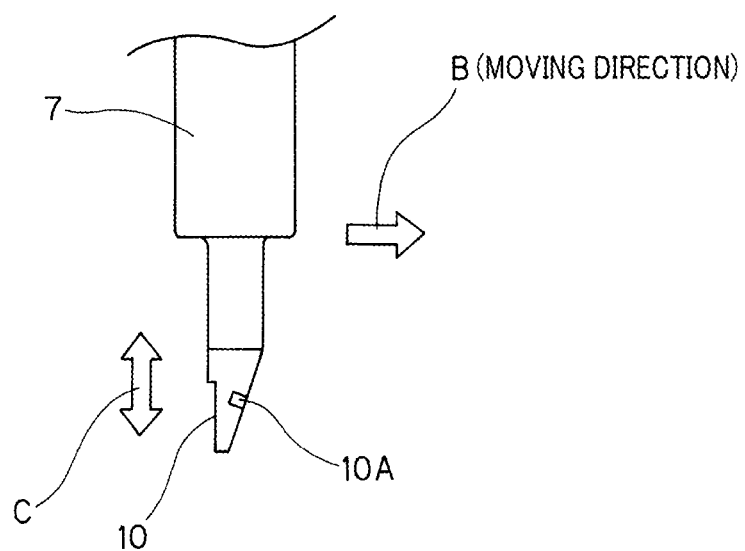
FIG. 12 is a side view showing a mounted part of a cutter blade.

One end of an ultrasonic transducer holder 6 is attached to the sliding portion 5. A half-ring shaped holder portion 6a is formed at the other end of the ultrasonic transducer holder 6, a cylindrical portion 7a of an ultrasonic transducer 7 is sandwiched between this holder portion 6a and another half-ring shaped holder portion 6b, and the ultrasonic transducer 7 is attached to the other end of the ultrasonic transducer holder 6 by coupling the respective holder portions 6a, 6b by a bolt. As shown in FIG. 12, the cutter blade 10 is fixed to the leading end of the ultrasonic transducer 7. An ultrasonic unit (not shown) is connected to the ultrasonic transducer 7 via a cord 7b (see FIG. 11). The ultrasonic transducer 7 is driven by the ultrasonic unit and the cutter blade 10 undergoes ultrasonic vibration in directions (directions of arrows C) substantially orthogonal to a moving direction (direction of arrow B) of the cutter blade 10 according to the vibration of the ultrasonic transducer 7. In this construction, the sliding portion 5 is constantly biased to right by an air pressure from the air supply port 4f until coming into contact with the right stopper 4e in FIG. 11, the cutter blade 10 comes into contact with the work and, if a reaction force load acts, the sliding portion 5 slides to left in FIG. 11 on the shaft 4d against the air pressure depending on the degree of this load, whereby the cutter blade 10 is in a floating state with respect to the work. A sliding range is defined by the left stopper 4e in FIG. 11. The slide table device 4 constitutes a floating mechanism, and the cutter blade 10 at the leading end of the deburring device 1 is movable in the directions of arrows A, i.e. in the floating state with respect to the work (resin molding product) to be described later.

Figure 13:
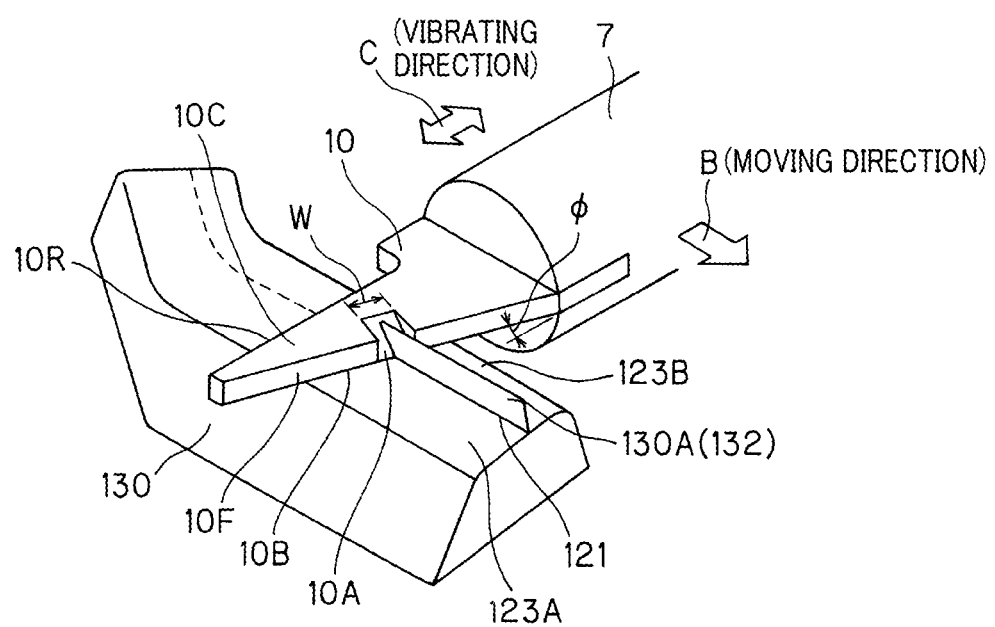
FIG. 13 is a perspective view enlargedly showing an operation of deburring a work.

FIG. 13 shows the cutter blade 10 during a deburring operation.

In FIG. 13, a work 130 shaped differently from the above work 130 (see FIG. 2) is shown to facilitate the description.

The cutter blade 10 includes a cutter blade main body 10C at a leading end side thereof, and this cutter blade main body 10C includes a front end surface 10F and a rear end surface 10R. The rear end surface 10R extends substantially in parallel with an extension of the ultrasonic transducer 7, and the front end surface 10F is swept back at a sweepback angle φ from the extension of the ultrasonic transducer 7 crossing at a right angle to the moving direction B. The cutter blade 10 is fixed to the ultrasonic transducer 7 by being brazed or threadably mounted.

The cutter blade 10 can cut off the overflow resins 130A, 150A of the works 130, 150 formed using the above molds 155 or the like. For example, the overflow resin 150A may be cut off along a cutting line L1 in FIG. 10, the overflow resin 130A may be cut off along a cutting line L2 in FIG. 7 and the overflow resin 150A may be cut off along a cutting line L3 in FIG. 8.

The resin molding product that is the work 130 is one of various products such as a nursing bed part, a copier part, a tool box, a thermal resin box, an automotive air spoiler, an automotive visor, an automotive center pillar and an automotive interior seat. The cutter blade 10 comes into contact with a base portion (base end) of the overflow resin 130A (burr 132) formed, for example, on a partition line 121. A cutting edge portion 10A corresponding to the base end of the overflow resin 130A and, for example, having a width W of about several mm and a curved profiling portion 10B corresponding to respective surface portions 123A, 123B of the work 130 and not constituting a cutting edge are provided on the front end surface 10F of the cutter blade 10. The width W of the cutting edge portion 10A is generally about 0.6 to 1 mm, but can be appropriately changed according to the shape of a burr formed on a work.

Figure 14:
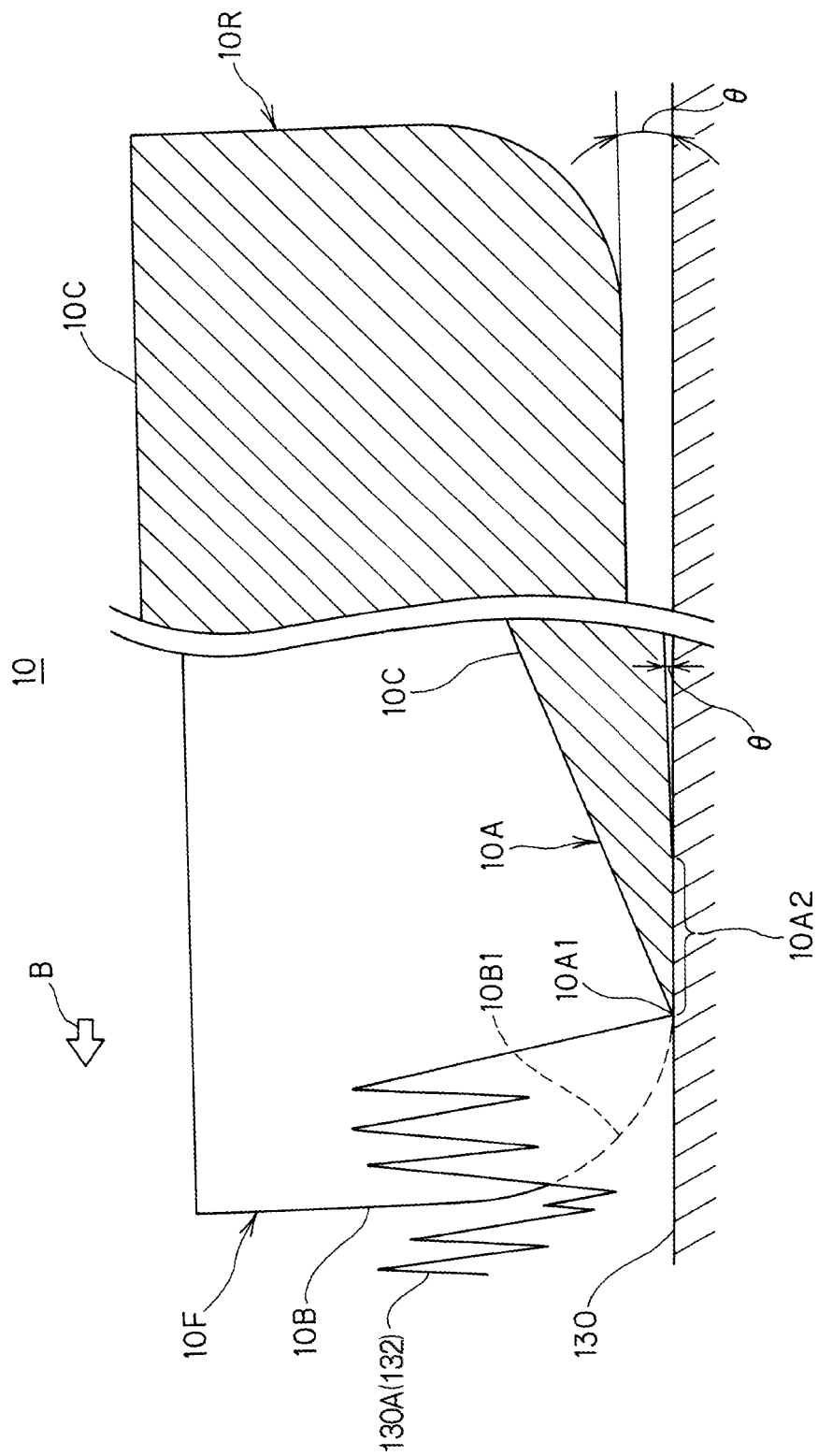
FIG. 14 is a sectional view of a leading end part of the cutter blade.

FIG. 14 is a sectional view including the cutting edge portion 10A of the cutter blade.

In this construction, a leading end portion of an edge 10A1 formed at a tip portion of the cutting edge portion 10A (part shown by hatching) is terminated at an intersection of a R-surface portion 10B of the profiling portion 10B formed on the front end surface 10F of the cutter blade 10 and the lower surface of the cutter blade main body 10C. In other words, the leading end portion of the edge 10A1 is swept back in a direction opposite to the moving direction (direction of arrow B) of the cutter blade 10 up to the intersection of the R-surface portion 10B1 of the profiling portion 10B and the lower surface of the cutter blade main body 10C. Since the position of the leading end portion of the edge 10A1 coincides with the lower surface of the cutter blade main body 10C in the cutting edge portion 10A having this construction, the leading end portion of the edge 10A1 can cut deep into the base end of the overflow resin 130A (burr 132) and remove the overflow resin 130A (burr 132) from the base end thereof.

Further, regardless of how the profiling portion 10B is in contact with the work and even in the case where the shape of the work is unstable like a resin part or a burr formed in a curved manner is to be cut off, the cutter blade 10 does not bite too much into the material, wherefore the occurrence of a trouble such as blade breakage can be suppressed.

The lower surface of the edge 10A1 of the cutting edge portion 10A extends in alignment with that of the cutter blade main body 10C and is formed with a leveling portion 10A2. The leveling portion 10A2 is held in contact with the work 130 at a substantially constant pressure dependent on an air pressure balance in the sliding portion 5. Thus, the leveling portion 10A2 smoothly levels the vicinity of the partition line 121 of the work 130 by pressing the base portion of the overflow resin 130A (burr 132) left uncut by the cutting edge portion 10A against the work 130.

Further, a lower surface 10C1 of the cutter blade main body 10C formed as a part located more backward than the leveling portion 10A2 is separated from the work 130 by a small angle θ, so that the rear end surface 10R of the cutter blade 10 is completely separated from the work 130.

As a result, the cutter blade 10 is held in contact with the work 130 only at a part corresponding to the leveling portion 10A2, wherefore the cutting edge portion 10A and the profiling portion 10B can be prevented from floating by the contact of other parts.

Next, the deburring operation is described.

When the deburring device 1 is operated, an operator performs, for example, direct teaching by actually moving the arm of the articulated robot 103 once or several times to store path information corresponding to arm movement paths. Alternatively, a technique of automatically generating path information utilizing shape information generated by a designing system such as a CAD system or the like is employed utilizing an automatic path generation system. However, the path information obtained by direct teaching or the automatic path generation system does not necessarily indicate correct paths for works 130 in the deburring operation if the respective works 130 to be actually deburred largely vary.

On the contrary, the deburring device 1 of this construction includes the above floating mechanism and can remove a burr by pressing the cutter blade 10 against a work with a pressing force slightly larger than planned and control profiling. Thus, an operation of correcting a taught position is hardly necessary. Therefore, a working time can be virtually shortened.

In this construction, as shown in FIG. 1, the articulated robot 103 takes the work (resin molding product) before deburring from the resin molding machine 101 using the hand portion 143 shown in FIG. 2 and transfers the work to the work receiving jig 105 in accordance with direct teaching. The overflow resin 130A (burr 132) is permitted on the work 130 as an intermediate product before deburring. Subsequently, the articulated robot 103 removes the overflow resin 130A (burr 132) of the work 130 on the work receiving jig 105 using the cutter blade 10 of the deburring device 1 shown in FIG. 2. In this case, the work 130 may be, for example, a resin tool box, a resin thermal box, a copier resin part, an automotive resin part, or the like.

For such a work, operations of six-axis joints 103A to 103F are controlled in the articulated robot 103 so that the orientation and driving direction of the cutter blade 10 of the arm tip portion 103G become optimal along a removal path of the overflow resin 130A (burr 132).

It goes without saying that, in this case, the sliding portion 5 of the arm tip portion 103G is in a floating state with respect to the work 130.

In this construction, a pressure applied to the air supply port 4f is controlled and the cutter blade 10 is pressed against the work 130 at a predetermined pressure upon driving the arm tip portion 103G based on the path information obtained by direct teaching or the like. The pressure applied to the air supply port can be automatically switched according to the posture of the cutter blade 10 and is constantly fixed regardless of the posture of the cutter blade 10.

In this state, the ultrasonic transducer 7 attached to the ultrasonic transducer holder 6 is driven, the profiling portion 10B is moved along the respective surface portions 123A, 123B of the work 130 while the cutter blade 10 is vibrated, for example, at an amplitude of about 30 to 50 μm, deburring is performed by moving the cutter blade 10 along the base end of the overflow resin 130A (burr 132) formed on the partition line of the work 130 and, simultaneously, the surface after deburring is leveled. Note that vibration is not limited to ultrasonic vibration, and vibration with an amplitude of about 10 to 150 μm may be, for example, given. Finally, the articulated robot 103 takes the work 131 as a finished product after removal of the overflow resin 130A (burr 132) out from the work receiving jig 105 using the suction pad portion 144 shown in FIG. 2 and transfers it onto the finished product discharge conveyor 109 to discharge it to the outside of the system via the conveyor 109. Further, the overflow resin 130A (burr 132) removed by the deburring device 1 is discharged onto the burr discharge conveyor 107 via an inclined hopper 133 to be discharged to the outside of the system.

In this construction, the finished product 131 completely free from a secondary burr after removal of the overflow resin 130A (burr 132) can be produced in the deburring device 1.

Thus, a conventional manual operation of removing a secondary burr becomes unnecessary, thereby making full automation in the deburring system possible to reduce a molding product cost. Further, since the overflow resin 130A (burr 132) is permitted to be formed in the mold of the resin molding machine 101 while full automation is realized, an expensive molding apparatus which strictly suppresses burr formation becomes unnecessary and a molding product cost can also be reduced by this.

In this resin product manufacturing system 100, the overflow resin 130A (burr 132) is permitted at an intermediate product stage, a so-called burr is formed on the tip of the overflow resin 130A (burr 132), the deburring device 1 includes the cutter blade 10 with the cutting edge portion 10A corresponding to the base end of the overflow resin 130A (burr 132) and the profiling portion 10B corresponding to the surface portions of the intermediate product and not constituting the cutting edge, and the overflow resin 130A (burr 132) integral to the intermediate product is cut off together with the burr by moving the cutter blade 10 along the base end of the overflow resin 130A (burr 132) while vibrating the cutter blade 10. Therefore, the burr-free finished product can be easily manufactured.

Figure 15:
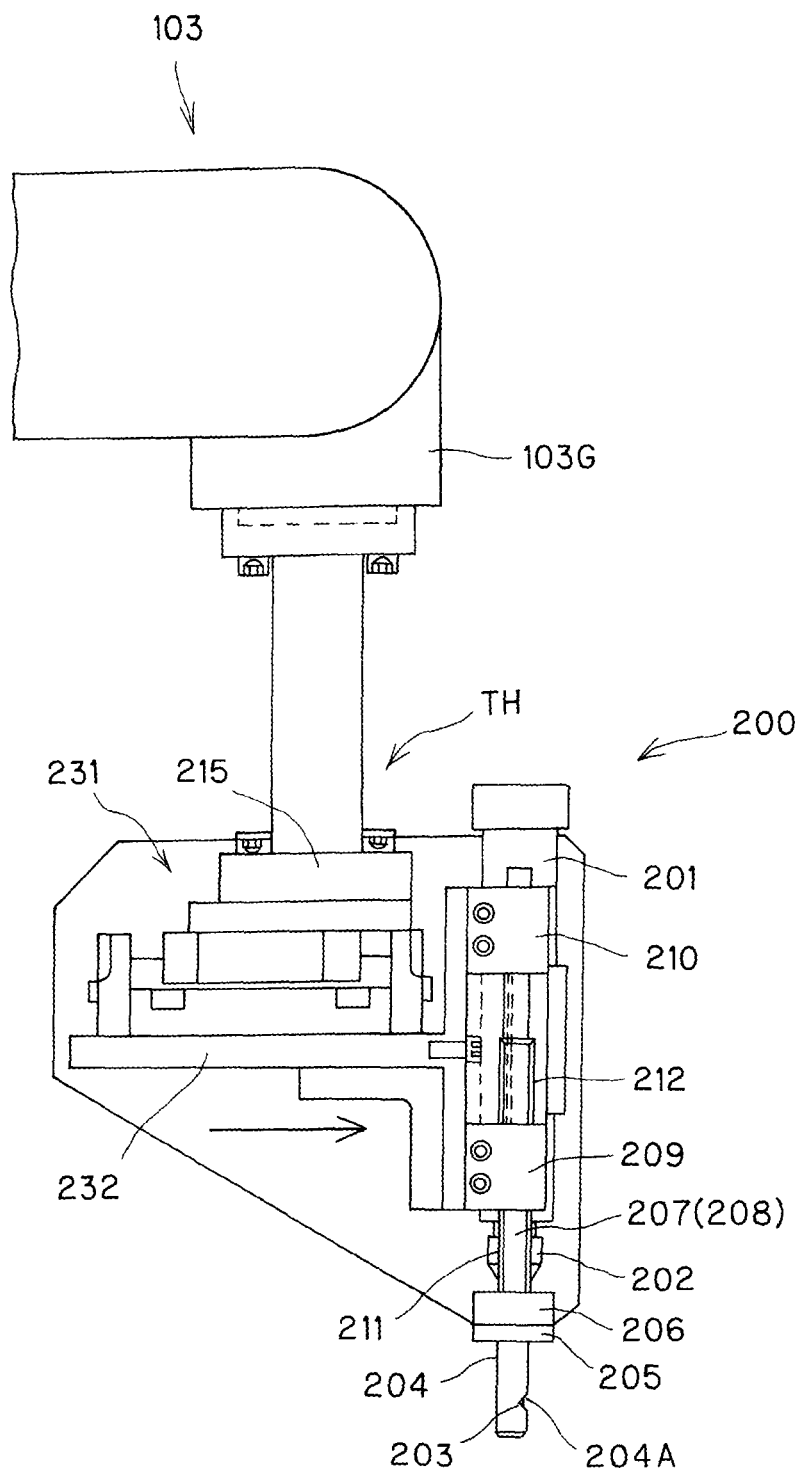
FIG. 15 is a front view showing another embodiment of the deburring device.

FIG. 15 shows another embodiment of the deburring device 1.

In this embodiment, a main body 215 of a tool holding unit TH is attached to the arm tip portion 103G of the articulated robot 103, and a pressing unit 231 is attached to the main body 215. The pressing unit 231 includes an air slide table 232, and a tool holder 200 is attached to the leading end of the air slide table 232. The tool holder 200 includes a motor 201, a supporting member 210, a spring 212, a supporting member 209, guide posts 207, 208, a spring 211 and a holder fixing member 206, and a jaw 205 of the tool holder 204 is fixed to the holder fixing member 206. An end mill 203 penetrates in the tool holder 204 and is fixed to a chuck 202 on an output shaft of the motor 201. A V-shaped opening 204, through which the end mill 203 is exposed, is formed on the outer periphery of the tool holder 204. In this deburring device 1, a product form is taught to the articulated robot 103 and a burr of a work is removed by the end mill 203 facing this opening 204A while the tool holder 204 is pressed against the work by the operation of the air slide table 232 and the V-shaped opening 204A of the tool holder 204 profiles a surface of a work as a profiling portion. In this case, the tool holder 204 is supported to float by the springs 211, 212, and a V-shaped wall surface of the opening 204A of the tool holder 204 functions as the profiling portion.

In this embodiment, an overflow resin 130A (burr 132) integrally formed on a parting surface of an intermediate product as described above can be efficiently cut off by the end mill 203.

Although the end mill 203 is mounted in the tool holder 204 in this construction, a cutting tool is not limited to the end mill 203 and may be a rotary bar formed with a multitude of cutting edges on the outer periphery of a bar, or the like.

FIG. 16 show another embodiment of the deburring device 1.

When the above resin molding machine 101 forms an intermediate product such as an airplane or automotive part using carbon fiber reinforced plastic (CFRP), the deburring device 1 according to this embodiment is suitable for removing a burr formed on a surface of the intermediate product.

Figures 16A, 16B, 16C:
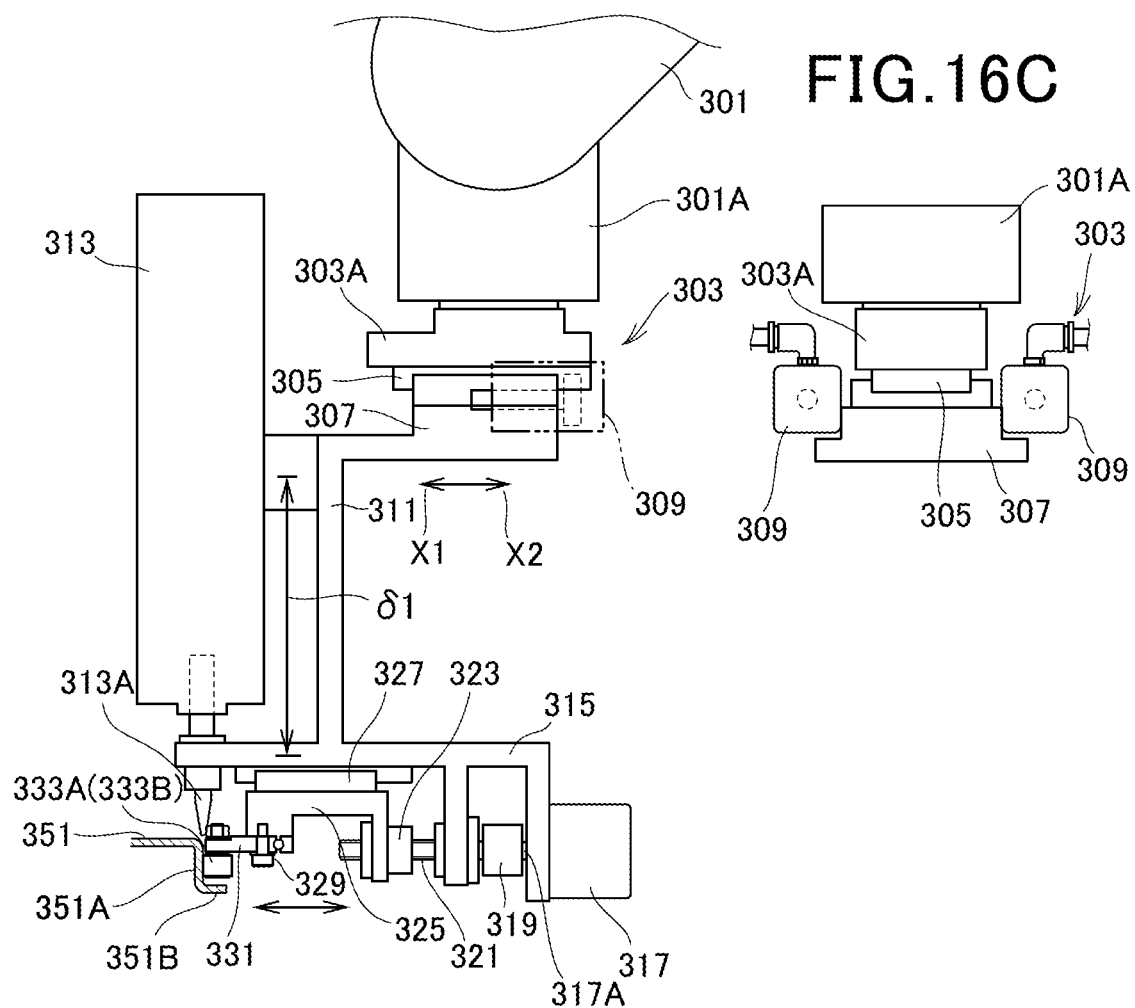
FIG. 16A is a front view.
FIG. 16B is a bottom view and FIG. 16C is a side view showing another embodiment of the deburring device.

In FIG. 16A, denoted by 301 is an arm of an articulated robot. A floating mechanism 303 is arranged on a tip 301A of this arm 301. The floating mechanism 303 includes a base portion 303A fixed to the tip 301A of the arm 301, a slider 307 slidable in both directions of arrows X1 and X2 via a linear bearing 305 is supported on this base portion 303A, and a pair of left and right air cylinders 309, 309 are coupled to the slider 307 as shown in FIG. 16C. The slider 307 is constantly pressed in the direction of arrow X1 by an air pressure by the operations of the air cylinders 309, 309 and pushed back, i.e. brought to a floating state when a pressure larger than the air pressure acts in the direction of arrow X2.

A stay 311 is fixed to the slider 307, and a nozzle main body 313 for water cutting (or laser cutting) is supported at two points vertically spaced apart by a distance δ1 on the front edge of the stay 311 in FIG. 16A. Further, a supporting plate 315 is fixed to the lower edge of the stay 311 in FIG. 16A, and a servo motor 317 is fixed to the supporting plate 315. An output shaft 317A of this servo motor 317 is coupled to a ball screw 321 via a coupling 319, and a slider 325 is coupled to the ball screw 321 via a screw nut 323.

These constitute a displacing unit.

This slider 325 is engaged with a linear bearing 327 fixed to the supporting plate 315.

As shown in FIG. 16B, a substantially U-shaped profiling head 331 is swingably supported on the leading end of the slider 325 via a pin 329, and a pair of profiling rollers (cam followers) 333A, 333B which are held in contact with a surface 351A to be profiled of an intermediate product 351 and make a rolling motion are rotatably supported on opposite end portions of the profiling head 331 while being spaced apart by a predetermined distance δ2.

A nozzle tip 313A of the nozzle main body 313 is located between the pair of profiling rollers 333A, 333B and water (or laser) is output from the nozzle tip 313A while the surface 351A to be profiled of the intermediate product 351 is profiled by the profiling rollers 333A, 333B, thereby cutting off and removing an overflow resin (burr) 351B integrally formed over the entire periphery of the intermediate product 351 as described above.

Figure 17A:
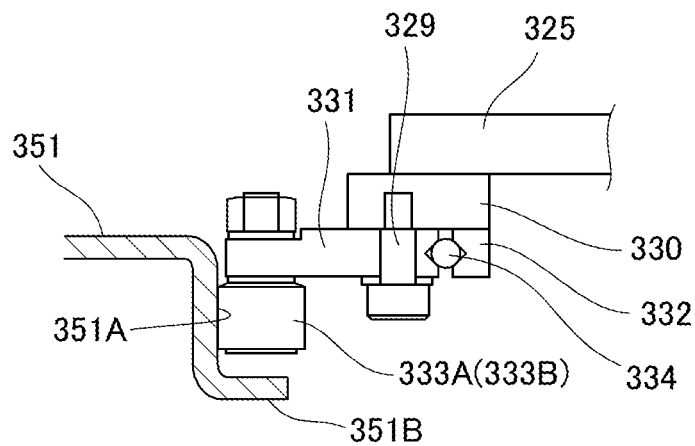
FIG. 17A is a side view and FIGS. 17B and 17C are sectional views showing a profiling head.
Figure 17B:
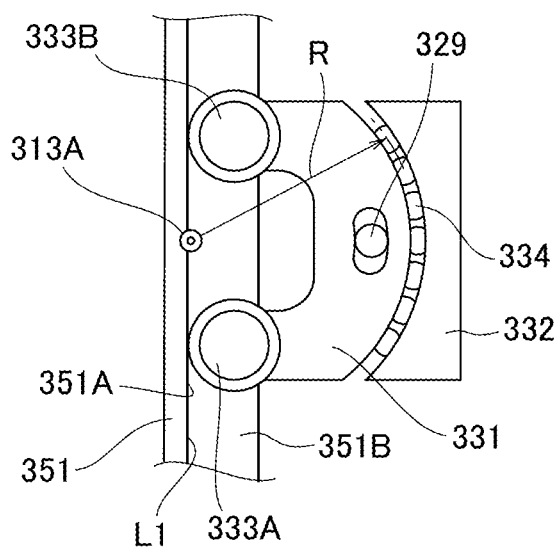
Figure 17C:
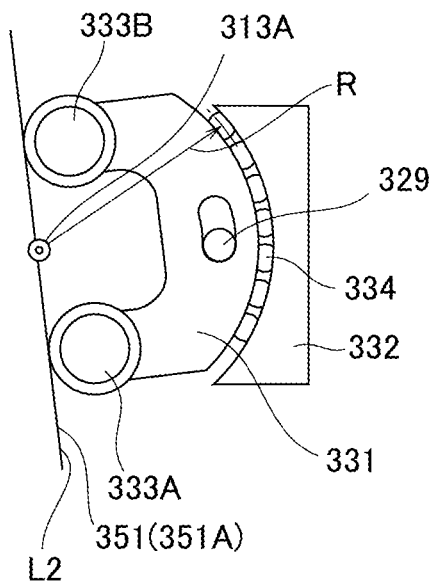

FIG. 17A is a side view of the profiling head and FIGS. 17B and 17C are plan views of the profiling head.

A receiving base 332 is fixed to the leading end of the slider 325 via a base 330, and the profiling head 331 is engaged with this receiving base 332 via a bearing 334 and this profiling head 331 is swingably supported via the pin 329.

The bearing 334 is formed by a curved surface having a radius of arc R centered on the nozzle tip 313A of the nozzle main body 313.

In this embodiment, when the surface 351A to be profiled of the intermediate product 351 is a straight line portion L1 as shown in FIGS. 17A and 17B, the function of the servo motor 317 is stopped, the positions of the pair of profiling rollers 333A, 333B with respect to the position of the nozzle tip 313A (dimension W1) are fixed, and water (or laser) is output from the nozzle tip 313A while the profiling rollers 333A, 333B are pressed along the surface 351A to be profiled of the intermediate product 351 by a propulsive force of the floating mechanism 303, to cut off the overflow resin 351B integrally formed over the entire periphery of the intermediate product 351. If the surface 351A to be profiled of the intermediate product 351 is an inclined straight line portion L2 as shown in FIG. 17C, the profiling head 331 swings about the pin 329 according to this inclination and the pair of profiling rollers 333A, 333B profile the inclined straight line portion L2.

Then, water (or laser) is output from the nozzle tip 313A while the surface 351A to be profiled of the intermediate product 351 is profiled by the profiling rollers 333A, 333B, thereby cutting off the overflow resin 351B integrally formed over the entire periphery of the intermediate product 351.

This deburring device 1 is not limited to the above embodiments. It goes without saying that an arbitrary deburring device can be applied. Although the cutting tool is supported on the arm tip of the robot and the work is deburred while being fixed in the above embodiments, the present invention is not limited to this and a work may be, for example, supported on the arm tip of the robot, the robot may be taught, and the work may be deburred as taught with the cutting tool fixed. In the case of fixing the cutting tool, the tool is desirably supported to float. In this case, the robot supports the work and the tool is provided on apart of a mount and performs a processing as taught by the robot.

REFERENCE SIGNS LIST 1 deburring device
10 cutter blade
100 resin product manufacturing system
101 resin molding apparatus
130, 150 work
130A, 150A overflow resin
151 fixed mold
153 movable mold
155 mold
151A, 153A matching surface
151B, 153B storing portion
160 gas vent hole

The invention claimed is:

1. A resin product manufacturing system, comprising:
a resin molding machine having a mold including a convex mold and a concave mold that form a cavity therebetween, the convex mold and the concave mold respectively having
parting faces that contact each other when the convex mold and the concave mold are closed, and
matching surfaces that extend in a mold opening direction and mate with each other in a mold closing direction when the convex mold and the concave mold contact each other at the parting faces; and
a deburring device that cuts off overflow resin integrally formed over an entire periphery of an intermediate product to thereby deburr the intermediate product and manufacture a finished product,
wherein the matching surfaces extend from the parting faces towards the cavity,
wherein the matching surfaces have an inclination angle θ relative to a mold opening closing direction, the inclination angle θ being provided continuously over an entire surface of the matching surfaces,
wherein the convex mold includes a storing portion that is formed in a concave shape on a surface of the convex mold, at a position between the matching surface of the convex mold and the cavity, the storing portion extending in the mold opening direction at a site corresponding to the entire periphery of the intermediate product and configured to extend in a plate-like shape, and stores the overflow resin so that the overflow resin is integrally formed at the entire periphery of the intermediate product along the matching surface of the convex mold and forms a vertical burr extending in the mold opening direction,
wherein molten resin material is injected into the cavity at a predetermined mold opening degree and is subjected to compression-molding by making the parting faces contact each other, to form the intermediate product, and
wherein the storing portion is contiguous with the cavity.

2. The resin product manufacturing system according to claim 1, wherein gas is vented through the storing portion.

3. A resin molding machine for forming an intermediate product including a vertical burr to be removed by a deburring device, comprising:
a mold including a convex mold and a concave mold that form a cavity therebetween, the convex mold and the concave mold respectively having
parting faces that contact each other when the convex mold and the concave mold are closed, and
matching surfaces that extend in a mold opening direction and mate with each other in a mold closing direction when the convex mold and the concave mold contact each other at the parting faces,
wherein the matching surfaces extend from the parting faces towards the cavity,
wherein the matching surfaces have an inclination angle θ relative to a mold opening closing direction, the inclination angle θ being provided continuously over an entire surface of the matching surfaces,
wherein the convex mold includes a storing portion that is formed in a concave shape on a surface of the convex mold, at a position between the matching surface of the convex mold and the cavity, the storing portion extending in the mold opening direction at a site corresponding to the entire periphery of the intermediate product and configured to extend in a plate-like shape, and stores the overflow resin so that the overflow resin is integrally formed at the entire periphery of the intermediate product along the matching surface and forms a vertical burr extending in a mold opening direction, wherein molten resin material is injected into the cavity at a predetermined mold opening degree and is subjected to compression-molding by making the parting faces contact each other, to form the intermediate product, and wherein the storing portion is contiguous with the cavity.

4. The resin molding machine according to claim 3, wherein gas is vented through the storing portion.

5. A mold for a resin molding machine for forming an intermediate product including a vertical burr to be removed by a deburring device, comprising:

a convex mold and a concave mold that form a cavity therebetween, the convex mold and the concave mold respectively having parting faces that contact each other when the convex mold and the concave mold are closed, and matching surfaces that extend in a mold opening direction and mate with each other in a mold closing direction when the convex mold and the concave mold contact each other at the parting faces, wherein the matching surfaces extend from the parting faces towards the cavity, wherein the matching surfaces have an inclination angle θ relative to a mold opening closing direction, the inclination angle θ being provided continuously over an entire surface of the matching surfaces, wherein the convex mold includes a storing portion that is formed in a concave shape on a surface of the convex mold, at a position between the matching surface of the convex mold and the cavity, the storing portion extending in the mold opening direction at a site corresponding to the entire periphery of the intermediate product and configured to extend in a plate-like shape, and stores the overflow resin so that the overflow resin is integrally formed at the entire periphery of the intermediate product along the matching surface and forms a vertical burr extending in a mold opening direction, wherein molten resin material is injected into the cavity at a predetermined mold opening degree and is subjected to compression-molding by making the parting faces contact each other, to form the intermediate product, and wherein the storing portion is contiguous with the cavity.

6. The mold according to claim 5, wherein gas is vented through the storing portion.

* * * * *